(12) United States Patent
Prichard et al.

(10) Patent No.: US 7,398,586 B2
(45) Date of Patent: Jul. 15, 2008

(54) METHODS AND SYSTEMS FOR MANUFACTURING A FAMILY OF AIRCRAFT WINGS AND OTHER COMPOSITE STRUCTURES

(75) Inventors: Alan K. Prichard, Lynnwood, WA (US); Victor K. Stuhr, Seattle, WA (US); Joseph R. Olivadoti, Gig Harbor, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/264,608

(22) Filed: Nov. 1, 2005

(65) Prior Publication Data

US 2007/0107189 A1      May 17, 2007

(51) Int. Cl.
B29C 41/12      (2006.01)
B64C 3/24      (2006.01)
(52) U.S. Cl. ...................................... 29/448; 244/123.1
(58) Field of Classification Search .................. 29/448; 244/132, 133, 123.1
See application file for complete search history.

(56) References Cited

U.S. PATENT DOCUMENTS

| | | | |
|---|---|---|---|
| 1,354,677 A | 10/1920 | Mix | |
| 2,370,801 A | 3/1945 | Klose | |
| 2,749,061 A | 6/1956 | Franz | |
| 2,750,134 A | 6/1956 | Hawkins et al. | |
| 2,807,437 A * | 9/1957 | Roush | 416/233 |
| 3,018,985 A | 1/1962 | Voigt | |
| 4,731,144 A | 3/1988 | Kommineni et al. | |
| 4,915,324 A | 4/1990 | Foreau | |
| 5,039,032 A | 8/1991 | Rudolph | |
| 5,097,784 A * | 3/1992 | Baudet | 114/102.31 |
| 5,273,806 A | 12/1993 | Lockshaw et al. | |
| 5,275,358 A | 1/1994 | Goldhammer | |
| 5,435,504 A | 7/1995 | Inoue | |

(Continued)

FOREIGN PATENT DOCUMENTS

DE             634884             7/1934

(Continued)

OTHER PUBLICATIONS

3DL Manufacturing Facts; http://na.northsails.com/Racing_Sails/3DLFacts.html; accessed Oct. 13, 2005; 2 pgs.

(Continued)

*Primary Examiner*—David P. Bryant
*Assistant Examiner*—Christopher M. Koehler
(74) *Attorney, Agent, or Firm*—Perkins Coie LLP

(57) ABSTRACT

Methods and systems for manufacturing composite aircraft wings and other structures are disclosed herein. A tool assembly for use in manufacturing composite laminates in accordance with one embodiment of the invention includes a tool plate carried by a movable support system. The tool plate includes a tool surface configured to support fiber-reinforced resin material and define an outer mold line (OML) of the fiber-reinforced resin material. The movable support system is configured to respond to signals from a controller to automatically change the shape of the tool surface and alter the OML of the finished part to suit the particular application. In one embodiment, the movable support system can include a plurality of telescoping actuators operably coupled to the tool plate.

18 Claims, 4 Drawing Sheets

U.S. PATENT DOCUMENTS

| | | | |
|---|---|---|---|
| 5,692,703 | A | 12/1997 | Murphy |
| 5,851,563 | A | 12/1998 | Hoffman |
| 5,897,078 | A | 4/1999 | Burnham |
| 5,909,858 | A | 6/1999 | Hawley |
| 6,106,649 | A * | 8/2000 | Slyne .................. 156/179 |
| 2002/0109272 | A1 | 8/2002 | Nelson |
| 2003/0037867 | A1 | 2/2003 | Bersuch |
| 2004/0011927 | A1 | 1/2004 | Christman |

FOREIGN PATENT DOCUMENTS

| | | |
|---|---|---|
| DE | 3242949 | 5/1984 |
| DE | 19810478 | 9/1999 |
| FR | 2548577 | 1/1985 |
| GB | 1284162 | 8/1972 |
| GB | 1425312 | 2/1976 |
| GB | 2268699 | 1/1994 |
| WO | WO-87/07233 | 12/1987 |
| WO | WO-94/01271 | 1/1994 |
| WO | WO-02/066235 | 8/2002 |
| WO | WO-03/031165 | 4/2003 |

OTHER PUBLICATIONS

History of 3DL; http://na.northsaols.com/Racing_Sails/3DLHistory.html; accessed Oct. 13, 2005; 2 pgs.
How is 3DL Made?; http://na.northsails.com/Racing_Sails/How3DLIsMade.html; accessed Oct. 13, 2005; 2 pgs.
North's 3DL Technology; http://na.northsails.com/Racing_Sails/3dl_technology.html; accessed Oct. 13, 2005; 1 pg.
European Search Report for EP06022491; Applicant: The Boeing Company; dated Feb. 27, 2007, European Patent Office, 10 pgs.
European Search Report; Jun. 15, 2007; The Boeing Company; 15 pgs; European Patent Office.

* cited by examiner

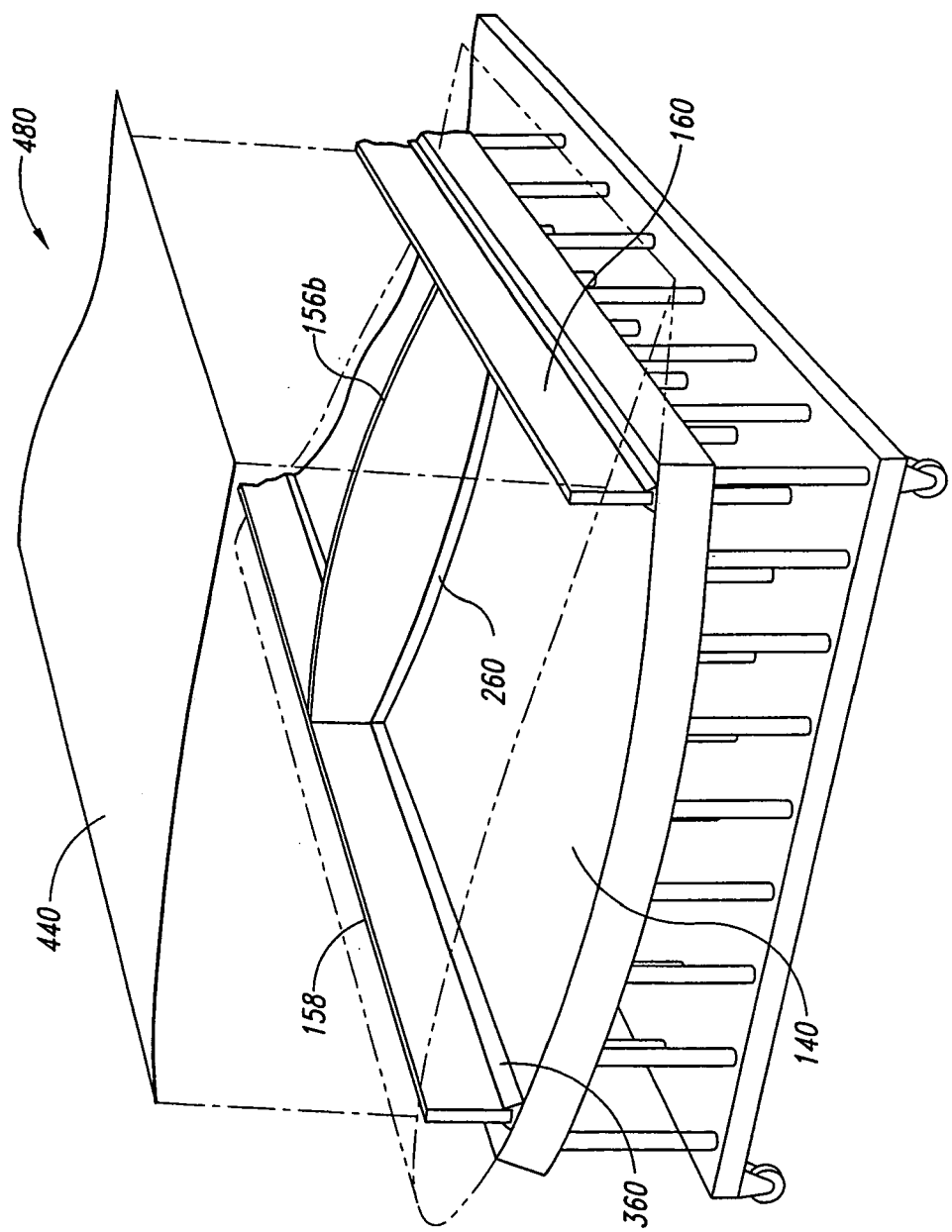

METHODS AND SYSTEMS FOR MANUFACTURING A FAMILY OF AIRCRAFT WINGS AND OTHER COMPOSITE STRUCTURES

TECHNICAL FIELD

The following disclosure relates generally to methods and systems for manufacturing aircraft wings and, more particularly, to methods and systems for manufacturing a family of aircraft wings.

BACKGROUND

Manufacturers of jet transport aircraft often develop families of aircraft which are derived from an original base model. This approach reduces manufacturing and development costs through the use of common parts and assemblies. Typically, the derivative models are more economical and profitable to operate because of growth in passenger capacity.

Although most growth in passenger capacity comes from stretching the fuselage, it would also be advantageous in some instances to increase passenger capacity (and/or fuel capacity, cargo capacity, etc.) by increasing the wing area. Conventional aircraft wing structures, however, are not easily modified to increase the wing area. This is unfortunate because wing growth may, in fact, offer a broader range of aircraft size options (i.e., gross weights) than fuselage growth.

The primary structure of conventional jet transport wings is typically manufactured from aluminum and other metals. This type of structure can be extremely labor intensive to build because many of the components are essentially handmade, custom parts that are unique to a particular aircraft model. A related consequence of this is that the assembly of these parts is often unique to the particular aircraft model as well. These factors make it difficult to economically develop a family of aircraft wings based on an original model.

SUMMARY

This summary is provided for the benefit of the reader only, and is not intended to limit the invention as set forth by the claims.

The present invention is directed generally to methods and systems for manufacturing composite structures. More specifically, the present invention is directed to methods and systems for manufacturing composite structures for aircraft. A tool assembly for manufacturing composite laminates in accordance with one aspect of the invention includes a tool plate carried by a movable support system. The tool plate has a tool surface configured to support one or more plies of fiber-reinforced resin material. The tool surface defines the outer mold line (OML) of the fiber-reinforced resin material. The movable support system is configured to respond to signals from a controller to automatically change the shape of the tool surface to alter the OML for different laminates. In one embodiment, the movable support system can include a plurality of telescoping actuators operably coupled to the tool plate. Each of the telescoping actuators is extendable and retractable along a central axis to change the shape of the tool surface.

An aircraft wing configured in accordance with another aspect of the invention includes a plurality of wing ribs extending between a first wing skin and a second wing skin. The first wing skin can be formed from fiber-reinforced resin material, and can include a plurality of first rib grooves positioned adjacent to a first inner surface. The second wing skin can also be formed from fiber-reinforced resin material, and can include a plurality of second rib grooves positioned adjacent to a second inner surface. In this aspect of the invention, each of the wing ribs that extends between the first and second wing skins includes a first portion received in one of the first ribbed grooves and a second portion received in an opposing one of the second rib grooves.

In one embodiment, the first wing skin can further include a first spar groove extending transverse to the plurality of first rib grooves, and the second wing skin can further include a second spar groove extending transverse to the plurality of second rib grooves. In this embodiment, the aircraft wing can further include a wing spar that extends between the first and second wing skins and has a first portion received in the first spar groove and a second portion received in the second spar groove.

A method of manufacturing aircraft wings in accordance with a further aspect of the invention includes providing a wing skin tool with a tool surface, and manufacturing a first skin for a first wing by positioning a first portion of fiber-reinforced resin material on the tool surface. The method can further include curing the first portion of fiber-reinforced resin material to form a first wing skin, and removing the first wing skin from the wing skin tool after curing. The method can additionally include manufacturing a second skin for a second wing by positioning a second portion of fiber-reinforced resin material on the tool surface, and curing the second portion of fiber-reinforced resin material to form a second wing skin. In this aspect of the invention, the first wing skin has a first tip portion spaced apart from a first root portion by a first span length, and the second wing skin has a second tip portion spaced apart from a second root portion by a second span length that is less than the first span length.

BRIEF DESCRIPTION OF THE DRAWINGS

FIG. 4 is an isometric view of a portion of a wing box assembly configured in accordance with an embodiment of the invention.

DETAILED DESCRIPTION

The following disclosure describes methods and systems for manufacturing a family of aircraft wings based on an original wing model. The wings can be used for a family of different aircraft, such as a family of jet transport aircraft. The wings can vary in a number of different dimensional aspects, including wing area, wing span, airfoil shape, twist, etc. Certain details are set forth in the following description to provide a thorough understanding of various embodiments of the invention. Other details describing well-known structures and systems often associated with aircraft and aircraft wings are not set forth below, however, to avoid unnecessarily obscuring the description of the various embodiments of the invention.

Many of the details, dimensions, angles and other features shown in the Figures are merely illustrative of particular embodiments of the invention. Accordingly, other embodiments can have other details, dimensions, angles and features without departing from the spirit or scope of the present invention. Furthermore, additional embodiments of the invention can be practiced without several of the details described below.

In the Figures, identical reference numbers identify identical or at least generally similar elements. To facilitate the discussion of any particular element, the most significant digit or digits of any referenced number refer to the Figure in which that element is first introduced. For example, element 110 is first introduced and discussed with reference to FIG. 1.

Figure 1:
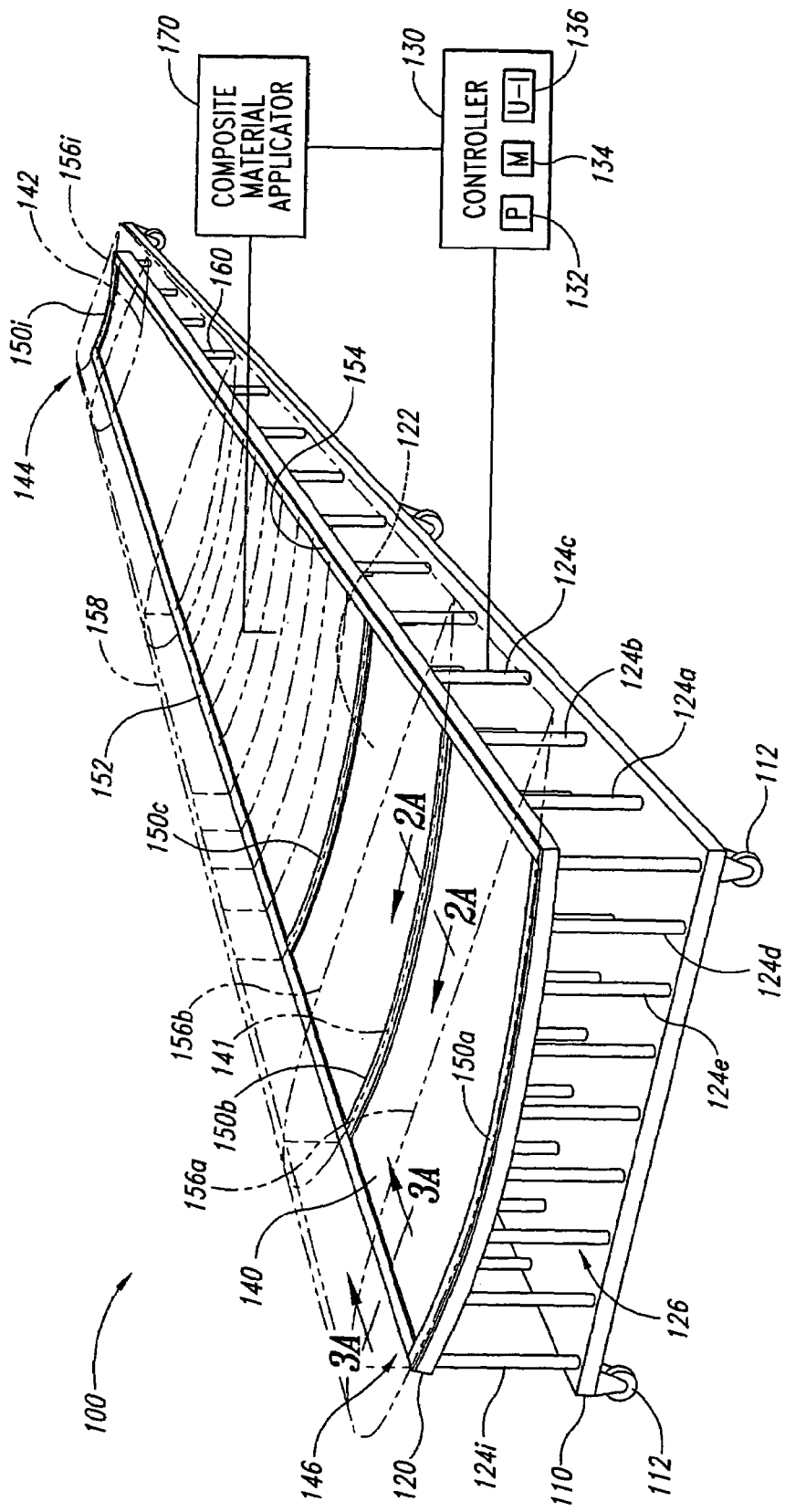
FIG. 1 is a partially schematic isometric view of a wing skin tool assembly configured in accordance with an embodiment of the invention.

FIG. 1 is a partially schematic isometric view of a wing skin tool assembly 100 ("tool assembly 100") configured in accordance with an embodiment of the invention. The tool assembly 100 can include a tool plate 120 having a tool surface 122 that forms an outer mold line (OML) of a composite skin 140. The tool plate 120 can be formed from nickel steel alloy (Invar) or other suitable material known in the art. In the illustrated embodiment, the tool surface 122 forms the OML of a wing spar box lower skin. In particular, in this embodiment the tool surface 122 has the constant-taper or trapezoidal planform of the wing spar box of the biggest wing in a family of wings. In other embodiments, however, the tool surface 122 can have other shapes for forming other skins and/or other panels for aircraft and other structures. For example, as described in greater detail below, in another embodiment a second tool assembly (not shown) that is at least generally similar in structure and function to the tool assembly 100 can be used to form the corresponding upper skin of the wing spar box.

The tool plate 120 of the illustrated embodiment is supported by a movable support system 126. In the illustrated embodiment, the movable support system 126 includes a plurality of telescoping actuators 124 (identified individually as actuators 124a–i) which extend upwardly from a base structure 110. Each of the actuators 124 is operably coupled to the tool plate 120, and can extend and retract in response to signals from a controller 130 (shown schematically in FIG. 1) to change the curvature of the tool surface 122 as desired. The controller 130 can include a processor 132 that transmits signals to the actuators 124 in accordance with computer-readable instructions stored on a memory 134. The computer-readable instructions can include one or more programs corresponding to different wing skin configurations for a family of aircraft wings. The controller 130 can further include a user interface 136 (e.g., keyboard, key pad, pointing device, etc.) for receiving a particular wing skin program selection from a user.

The composite skin 140 can be manufactured with the tool assembly 100 in one embodiment as follows. First, a user (not shown) operates the user-interface 136 on the controller 130 to select a desired wing skin configuration. For example, the user may select a wing skin configuration corresponding to the largest wing in a particular family of wings. The processor 132 responds to this selection by transmitting a corresponding set of signals to the actuators 124 in accordance with a program stored on the memory 134. The actuators 124 respond to the signals by individually extending and/or retracting as needed to move the tool surface 122 into the shape associated with the particular wing selection. More specifically, the actuators 124 extend or retract as needed to provide the tool surface 122 with the correct camber, twist, angle, etc. for the particular wing selection.

Next, an automated tape-laying machine 170, or other suitable device known in the art, applies fiber-reinforced resin material to the tool surface 122 to form the composite skin 140. The fiber-reinforced resin material can include graphite/epoxy and/or other composite materials commonly used in the manufacture of structural components, including, for example, glass, carbon, and/or aramid fibers carried in a polymer matrix of epoxy, vinylester, or polyester thermosetting plastic. The tape-laying machine 170 applies the fiber-reinforced resin material in a predetermined number of layers, and in a predetermined pattern and orientation that corresponds to the particular type of wing skin selected by the user. In other embodiments, however, the tape-laying machine 170 can be omitted and the composite material can be applied to the tool surface 122 by hand.

Once the fiber-reinforced resin material of the composite skin 140 has been applied to the tool surface 122, additional portions of fiber-reinforced resin material (e.g., composite tape) can be applied on top of the composite skin 140 in a plurality of rib built-up areas 150 (identified individually as rib built-up areas 150a–i). Similarly, additional fiber-reinforced resin material can be applied to the composite skin 140 along a front spar built-up area 152 and a rear spar built-up area 154. After the various pieces of fiber-reinforced resin material have been applied to the tool surface 122, the composite lay-up can be evacuated and compressed under a suitable vacuum bag system (not shown) for curing. In this regard, the base structure 110 can include a plurality of rollers 112 so that the ply lay-up can be easily rolled into an oven, autoclave, or other suitable curing station. As described in greater detail below, after curing, the rear spar built-up area 154, the front spar built-up area 152, and the rib built-up areas 150 can be machined or otherwise finished to facilitate attachment of a rear spar 160, a front spar 158, and a plurality of ribs 156a–i (shown in phantom in FIG. 1), to the wing skin 140.

Various types of actuators can be used for the telescoping actuators 124 of the illustrated embodiment. For example, in one embodiment, the actuators 124 can be hydraulically actuated. In another embodiment, the actuators 124 can be pneumatically actuated. In further embodiments, the actuators 124 can be mechanically and/or electrically actuated. The actuators 124 can include position sensors (not shown) to measure extension/retraction lengths. The actuators 124 can further include ball-joints (not shown) for attachment to the tool plate 120. Such joints can allow rotation of the tool plate 120 to accommodate movement of the tool surface 122. In addition, as those of ordinary skill in the art will appreciate, in yet other embodiments, the movable support system 126 can utilize other shape-changing devices to alter the shape of the tool surface 122. Such devices can include, for example, mechanical drive-screws, scissor jacks, pneumatic bladder systems, electromagnetic actuators, servomotors, rack and pinion systems, etc.

One feature of the embodiment described above is that it can be used to manufacture a series of different wing skins for a family of aircraft. For example, fiber-reinforced resin material can be applied to the entire tool surface 122 from a root portion 146 to a tip portion 144 when producing a skin for the largest wing box of a particular family. For a smaller wing, however, the fiber-reinforced resin material need only be applied to that portion of the tool surface 122 corresponding to the smaller wing box. For example, in one embodiment, a smaller wing skin can be produced by applying fiber-reinforced resin material to only that portion of the tool surface 122 that extends from a first chord line 141 to the tip portion 144. In another embodiment, a smaller wing skin can be produced by applying fiber-reinforced resin material to only that portion of the tool surface 122 that extends from the root portion 146 to a second chord line 142. One advantage of using a single tool assembly to manufacture a family of different wing skins is that it can reduce the tooling costs significantly.

Another feature of the embodiment described above is that the movable support system 126 can be automatically activated by the controller 130 to change the shape (e.g., the camber, twist, angle, etc.) of the tool surface 122 to accommodate the particular type of wing being built. For example, when a larger wing is being built, the controller 130 can cause the actuators 124 to extend and/or retract as necessary to give the tool surface 122 a desirable shape that provides the resulting wing with favorable aerodynamic characteristics (e.g., low drag). When a smaller wing is being produced, the controller 130 can optimize the shape of the tool surface 122 for the smaller wing. For example, the smaller wing may require less twist than the larger wing. In addition, the controller 130 can also be programmed to alter the tooling surface 122 for reasons other than aerodynamics including, for example, structural, dynamic, and/or fuel load considerations. Accordingly, a further advantage of the tool assembly 100 is that it can be used to make a series of wing skins having the same, or nearly the same, planform but with different cambers, twists, and/or other dimensional characteristics.

In another embodiment similar to the embodiment described above with reference to FIG. 1, the actuators 124 can be "passive" devices which are extended and/or retracted by, for example, the composite material applicator 170 to move the tool surface 122 into the pre-programmed shape. In this embodiment, the material applicator 170 can include a head (not shown) that realeasably attaches to selected actuators and extends or retracts the actuators as needed to provide the tool surface with the desired contour. Once in position, the actuators can self-clamp to maintain the shape of the tool surface 122.

Figure 2A:
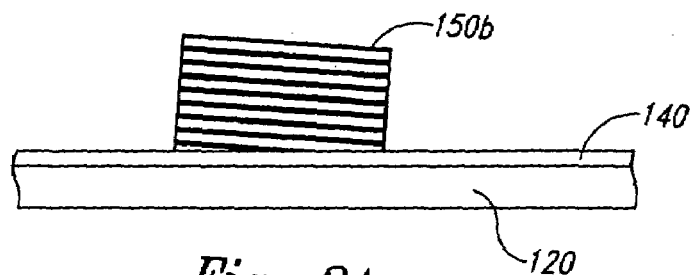
FIGS. 2A–2D are a series of enlarged, cross-sectional views illustrating various stages of a method for joining a wing rib to a wing skin in accordance with an embodiment of the invention.
Figure 2B:
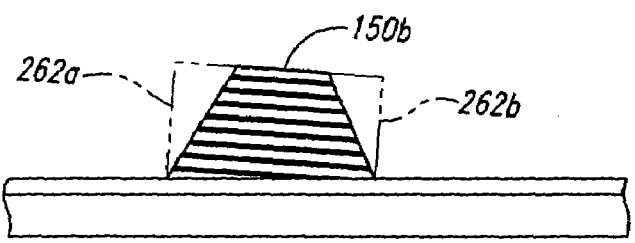
Figure 2C:
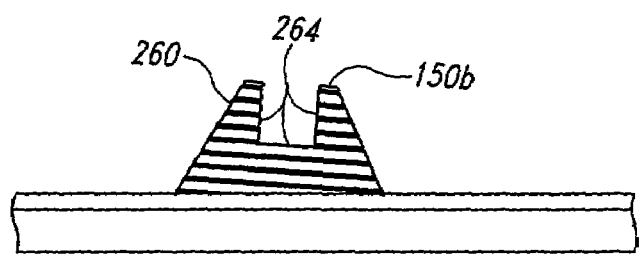
Figure 2D:
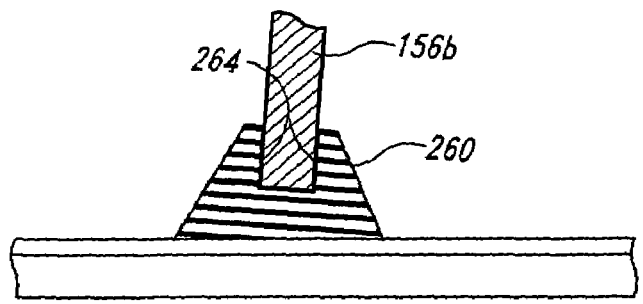

FIGS. 2A–2D are a series of enlarged, cross-sectional views taken along line 2A—2A in FIG. 1. These views illustrate various stages in a method of forming a self-jigging rib foundation 260 (FIG. 2C) in each of the rib built-up areas 150 shown in FIG. 1. Referring first to FIG. 2A, this view illustrates the rib built-up area 150b after bonding to the composite skin 140 during the co-curing process. As shown in FIG. 2B, a first side portion 262a and a second side portion 262b of the built-up area 150b can be removed after curing (by, e.g., a computer numerically-controlled (CNC) milling machine) to give the built-up area 150b a tapered cross section. In other embodiments, the rib foundation 260 can have other cross-sectional shapes depending on various structural and/or cost considerations. Next, a slot or groove 264 is machined or otherwise formed in the built-up area 150b as shown in FIG. 2C. As shown in FIG. 2D, a lower portion of the wing rib 156b can then be inserted into the groove 264 and bonded to the rib foundation 260 during assembly of the wing box structure.

Figure 3A:
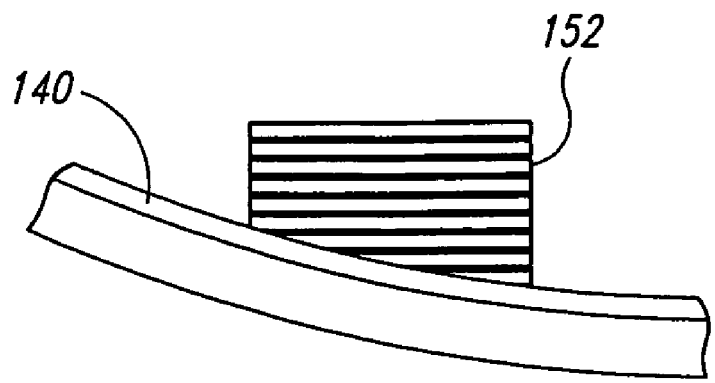
FIGS. 3A and 3B are enlarged, cross-sectional views illustrating various stages of a method for joining a wing spar to a wing skin in accordance with an embodiment of the invention.
Figure 3B:
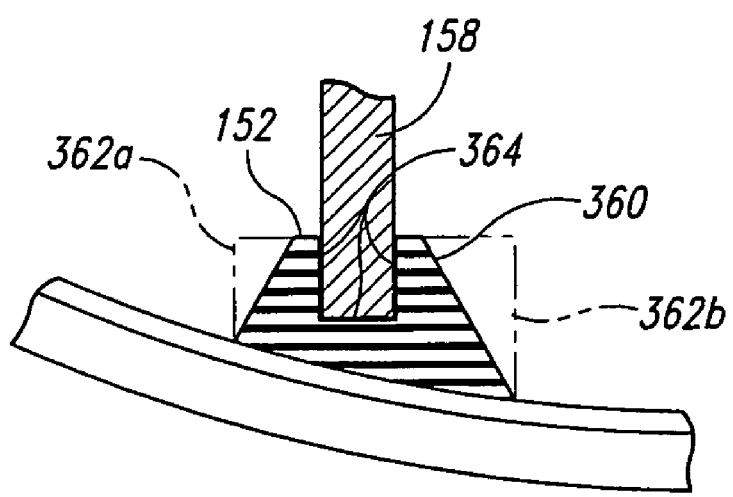

FIGS. 3A and 3B are enlarged, cross-sectional views taken along line 3A—3A in FIG. 1. These views illustrate various stages in a method of forming a self-jigging spar foundation 360 (FIG. 3B) in the front spar built-up area 152 of FIG. 1. The method is at least generally similar to the method described above for forming the wing rib foundations 260. For example, FIG. 3A shows the front spar built-up area 152 after bonding to the wing skin 140 during the co-curing process. Referring next to FIG. 3B, a first side portion 362a and a second side portion 362b can be removed from the front spar built-up area 152 to give the spar foundation 360 a tapered cross-section. A slot or spar groove 364 can then be machined or otherwise formed in the front spar built-up area 152 to receive a lower edge of the front spar 158.

One feature of the embodiment described above with reference to FIGS. 2A–3B is that the controller 130 (or an associated controller) can control the apparatuses that lay down the composite material and/or form the slots in the built-up areas, in addition to controlling the actuators 124. The system that controls the application of the fiber-reinforced resin material can be programmed to address any desired geometry change resulting from a change in wing size. Further, different software programs can be used to vary the ply lay-ups in different locations as required to address different load cases. In the foregoing manner, shifting from one size of wing to another, or from one aircraft model to another, only entails implementing new software programs stored on the memory 134 of the controller 130.

FIG. 4 is an exploded isometric view of a root portion of a wing box structure 480 configured in accordance with an embodiment of the invention. In this embodiment, the front spar 158, the rear spar 160, and the wing ribs 156 are properly located and bonded to the lower wing skin 140 by means of the spar foundation 360 and rib foundation 260 described above. An upper wing skin 440 that is at least generally similar in structure and function to the lower wing skin 140 can be located and bonded to the front spar 158, the rear spar 160, and the wing ribs 156 in a similar manner to complete the wing box structure 480.

One feature of the rib and spar foundations described above is that they can be used as self-jigging structures to automatically locate ribs and spars, respectively, during wing box construction. This feature can greatly reduce wing manufacturing time. Further, in one embodiment the rib and/or spar locations can remain constant for one or more wings in a given family of wings. Utilizing common rib and spar locations can greatly reduce the number of different parts that are required for the family of wings.

In the case in which rib locations have to change in transitioning from one wing model to another, the same basic tooling could be used for the spar box skins and foundations, but the program implemented by the controller 130 (FIG. 1) could be altered for the particular model to reflect new rib locations and other changes. Specifically, in this particular embodiment, the build process would make no distinction for new rib positions, and no new tooling would be needed. Alternatively, another method would be to place ribs at every anticipated location for each wing in the family of wings, and to adjust the strength of each rib to fit the loads for the particular model under construction. In this manner, a typical rib for a smaller wing in the family might become an engine rib for a larger wing in the family. Likewise, a landing gear rib for a smaller wing may become a typical rib for a larger wing member. Tailoring the strength of each rib in each particular case can ensure that the total weight for each wing is at least approximately optimized.

In one embodiment of the methods and systems described above, the tool assembly 100 can be used to form lower wing box skins, and a similar tool can be used to form the corresponding upper wing box skins. In one aspect of this particular embodiment, the tool assemblies can be sized for the largest anticipated wings of a particular family. Smaller wings could then be built by laying down fiber-reinforced resin material (i.e., composite material) over limited areas of the basic tools.

In one embodiment, the largest wing and fuselage combination for the heaviest aircraft in a family of aircraft can be designed first, and the smaller variants derived from this large baseline. This approach can ensure that adequate volume provisions exist in the fuselage and/or wings for fuel and other accommodations. Starting with the largest wing member of the family and ensuring it has adequate fuel volume can help ensure that each smaller family member also has adequate fuel volume. For each member of the aircraft family, it is likely that the landing gear location relative to the wing may have to change. Both inboard and outboard positional changes, as well as fore and aft changes, are likely and could cause the loads in particular ribs to differ from model to model. To accommodate the change in loads, gear ribs for a particular model could designed for particular load requirements. Further, generic ribs could be placed at all anticipated gear rib locations for all family members, but the thickness and other structural features could be made unique for the particular load requirements. The same approach can be used for accommodating various engine sizes and location on the wing.

We claim:

1. A method of manufacturing aircraft wing skins, the method comprising:
    providing a wing skin tool having a concave tool surface configured to support one or more plies of fiber-reinforced resin material disposed thereon, the tool surface defining an outer mold line of the fiber-reinforced resin material;
    manufacturing a first skin for a first wing by:
        positioning a first portion of prefabricated fiber-reinforced resin material over a first portion of the tool surface to at least generally cover the first portion of the tool surface;
        curing the first portion of fiber-reinforced resin material to harden the first portion of fiber-reinforced resin material and form a first wing skin; and
        removing the first wing skin from the wing skin tool, wherein the first wing skin has a first tip portion spaced apart from a first root portion by a first span length; and
    manufacturing a second skin for a second wing by:
        positioning a second portion of prefabricated fiber-reinforced resin material over a second portion of the tool surface to at least generally cover the second portion of the tool surface; and
        curing the second portion of fiber-reinforced resin material to harden the second portion of fiber-reinforced resin material and form a second wing skin, wherein the second wing skin has a second tip portion spaced apart from a second root portion by a second span length, the second span length being less than the first span length.

2. The method of claim 1 wherein positioning a first portion of fiber-reinforced resin material on the tool surface includes extending the first portion of fiber-reinforced resin material over a full length of the tool surface, and wherein positioning a second portion of fiber-reinforced resin material on the tool surface includes extending the second portion of fiber-reinforced resin material over a partial length of the tool surface.

3. The method of claim 1 wherein positioning a first portion of fiber-reinforced resin material on the tool surface includes extending the first portion of fiber-reinforced resin material over a full length of the tool surface from a wing tip region to a wing root region, and wherein positioning a second portion of fiber-reinforced resin material on the tool surface includes extending the second portion of fiber-reinforced resin material over a partial length of the tool surface from the wing tip region to short of the wing root region.

4. A method of manufacturing aircraft wing skins, the method comprising:
    providing a wing skin tool having a concave tool surface configured to support one or more plies of fiber-reinforced resin material disposed thereon, the tool surface defining an outer mold line of the fiber-reinforced resin material;
    manufacturing a first skin for a first wing by;
        positioning a first portion of prefabricated fiber-reinforced resin material over a first portion of the tool surface to at least generally cover the first portion of the tool surface;
        positioning an additional portion of fiber-reinforced resin material on the first portion of fiber-reinforced resin material to form a built up area;
        curing the first portion of fiber-reinforced resin material and the additional portion of fiber-reinforced resin material to harden the first portion of fiber-reinforced resin material and the additional portion of fiber-reinforced resin material and form a first wing skin;
        machining a rib groove in the built up area after curing the first portion of fiber-reinforced resin material and the additional portion of fiber-reinforced resin material;
        removing the first wing skin from the wing skin tool, wherein the first wing skin has a first tip portion spaced apart from a first root portion by a first span length; and
    manufacturing a second skin for a second wing by:
        positioning a second portion of prefabricated fiber-reinforced resin material over a second portion of the tool surface to at least generally cover the second portion of the tool surface; and
        curing the second portion of fiber-reinforced resin material to harden the second portion of fiber-reinforced resin material and form a second wing skin, wherein the second wing skin has a second tip portion spaced apart from a second root portion by a second span length, the second span length being less than the first span length.

5. The method of claim 4 wherein the first wing skin has a first shape, and wherein manufacturing a second skin for a second wing further includes changing the shape of the tool surface so that the second wing has a second shape, different from the first shape.

6. The method of claim 4 wherein the first wing skin has a first camber, and wherein manufacturing a second skin for a second wing further includes changing the shape of the tool surface so that the second wing has a second camber, different from the first camber.

7. The method of claim 4 wherein the first wing skin has a first twist, and wherein manufacturing a second skin for a second wing further includes changing the shape of the tool surface so that the second wing has a second twist, different from the first twist.

8. A method of claim 4, further comprising:
    forming a second groove in the second wing skin in the same locations relative to the tool surface as the first groove in the first wing skin.

9. A method of manufacturing wing skins for a family of different aircraft wings, the method comprising:
    providing a wing skin tool having a conformable tool surface configured to support one or more plies of fiber-reinforced resin material disposed thereon, the tool surface defining an outer mold line of the fiber-reinforced resin material;
    manufacturing a first skin for a first wing by:
        moving the tool surface to a first shape;

while maintaining the tool surface in the first shape, positioning a first portion of prefabricated fiber-reinforced resin material over a first portion of the tool surface to at least generally cover the first portion of the tool surface;

positioning an additional portion of fiber-reinforced resin material on the first portion of fiber-reinforced resin material;

curing the first portion of fiber-reinforced resin material and the additional portion of fiber-reinforced resin material to harden the first portion of fiber-reinforced resin material and the additional portion of fiber-reinforced resin material and form a first wing skin;

forming a groove in the additional portion of fiber-reinforced resin material after curing the first portion of fiber-reinforced resin material and the additional portion of fiber-reinforced resin material, wherein the groove is configured to receive a structural member; and removing the first wing skin from the wing skin tool, wherein the first wing skin has a first tip portion spaced apart from a first root portion by a first span length; and manufacturing a second skin for a second wing by;

changing the shape of the tool surface from the first shape to a second shape;

while maintaining the tool surface in the second shape, positioning a second portion of prefabricated fiber-reinforced resin material over a second portion of the tool surface to at least generally cover the second portion of the tool surface, wherein the second portion of the tool surface is different than the first portion of the tool surface; and curing the second portion of fiber-reinforced resin material to harden the second portion of fiber-reinforced resin material and form a second wing skin, wherein the second wing skin has a second tip portion spaced apart from a second root portion by a second span length, the second span length being less than the first span length.

10. The method of claim 9 wherein the first wing skin has a first camber, and wherein changing the shape of the tool surface from the first shape to a second shape includes changing the shape of the tool surface so that the second wing has a second camber, different from the first camber.

11. The method of claim 9 wherein the first wing skin has a first twist, and wherein changing the shape of the tool surface from the first shape to a second shape includes changing the shape of the tool surface so that the second wing has a second twist, different from the first twist.

12. The method of claim 9 wherein moving the tool surface to a first shape includes automatically controlling a plurality of actuators operably coupled to the tool surface to form the tool surface into the first shape, and wherein changing the shape of the tool surface from the first shape to a second shape includes automatically controlling the plurality of actuators to form the tool surface into the second shape, different from the first shape.

13. The method of claim 9 wherein changing the shape of the tool surface includes automatically changing the shape of the tool surface in response to instructions from a computer program.

14. The method of claim 9 wherein changing the shape of the tool surface includes automatically extending one or more actuators operably coupled to the tool surface in response to instructions from a computer program.

15. The method of claim 9:

wherein positioning a first portion of fiber-reinforced resin material over a first portion of the tool surface includes automatically positioning fiber-reinforced resin material on the tool surface in response to instructions from a first computer program; and wherein changing the shape of the tool surface includes automatically changing the shape of the tool surface in response to instructions from a second computer program.

16. The method of claim 9 wherein positioning a first portion of fiber-reinforced resin material on the tool surface includes extending the first portion of fiber-reinforced resin material over a full length of the tool surface from a wing tip region to a wing root region, and wherein positioning a second portion of fiber-reinforced resin material on the tool surface includes extending the second portion of fiber-reinforced resin material over a partial length of the tool surface from the wing tip region to short of the wing root region.

17. The method of claim 9 wherein
providing a wing skin tool having a conformable tool surface includes providing a wing skin tool with a trapezoidal shaped planform.

18. A method of manufacturing wing skins for a family of different aircraft wings, the method comprising:

providing a wing skin tool having a conformable tool surface configured to support one or more plies of fiber-reinforced resin material disposed thereon, the tool surface defining an outer mold line of the fiber-reinforced resin material;

manufacturing a first skin for a first wing by:

positioning a first portion of prefabricated fiber-reinforced resin material over a first portion of the tool surface to at least generally cover the first portion of the tool surface;

positioning an additional portion of fiber-reinforced resin material on the first portion of fiber-reinforced resin material to form a built up area;

curing the first portion of fiber-reinforced resin material and the additional portion of fiber-reinforced resin material to harden the first portion of fiber-reinforced resin material and the additional portion of fiber-reinforced resin material and form a first wing skin;

machining a rib groove in the built up area after curing the first portion of fiber-reinforced resin material and the additional portion of fiber-reinforced resin material;

removing the first wing skin from the wing skin tool, wherein the first wing skin has a first tip portion spaced apart from a first root portion by a first span length; and manufacturing a second skin for a second wing by:

changing the shape of the tool surface;

positioning a second portion of prefabricated fiber-reinforced resin material over a second portion of the tool surface to at least generally cover the second portion of the tool surface, wherein the second portion of the tool surface is different than the first portion of the tool surface; and curing the second portion of fiber-reinforced resin material to harden the second portion of fiber-reinforced resin material and form a second wing skin, wherein the second wing skin has a second tip portion spaced apart from a second root portion by a second span length, the second span length being less than the first span length.

* * * * *

UNITED STATES PATENT AND TRADEMARK OFFICE
CERTIFICATE OF CORRECTION

PATENT NO. : 7,398,586 B2
APPLICATION NO. : 11/264608
DATED : July 15, 2008
INVENTOR(S) : Prichard et al.

It is certified that error appears in the above-identified patent and that said Letters Patent is hereby corrected as shown below:

In column 5, line 33, delete "realeasably" and insert -- releasably --, therefor.

In column 7, line 26, in Claim 1, after "by:" insert -- while maintaining the concave shape of the tool surface, --.

In column 7, line 30, in Claim 1, after "surface;" insert -- positioning an additional portion of fiber-reinforced resin material on the first portion of fiber-reinforced resin material; --.

In column 7, line 31, in Claim 1, after "material" insert -- and the additional portion of fiber-reinforced resin material --.

In column 7, line 33, in Claim 1, before "form" insert -- the additional portion of fiber-reinforced resin material and --.

In column 7, line 33, in Claim 1, after "skin;" insert -- forming a groove in the additional portion of fiber-reinforced resin material after curing the first portion of fiber-reinforced resin material and the additional portion of fiber-reinforced resin material, wherein the groove is configured to receive a structural member; --.

In column 7, line 38, in Claim 1, after "by:" insert -- while maintaining the concave shape of the tool surface, --.

In column 8, line 6, in Claim 4, after "by" delete ";" and insert -- : --, therefor.

In column 8, line 17-18, in Claim 4, delete "fiber- reinforced" and insert -- fiber-reinforced --, therefor.

In column 8, line 55, in Claim 8, delete "A" and insert -- The --, therefor.

In column 8, line 57, in Claim 8, delete "locations" and insert -- location --, therefor.

UNITED STATES PATENT AND TRADEMARK OFFICE
CERTIFICATE OF CORRECTION

PATENT NO. : 7,398,586 B2
APPLICATION NO. : 11/264608
DATED : July 15, 2008
INVENTOR(S) : Prichard et al.

It is certified that error appears in the above-identified patent and that said Letters Patent is hereby corrected as shown below:

In column 9, line 24, in Claim 9, after "by" delete ";" and insert -- : --, therefor.

Signed and Sealed this

Ninth Day of December, 2008

JON W. DUDAS
*Director of the United States Patent and Trademark Office*